(12) United States Patent
Ghait et al.

(10) Patent No.: US 8,983,899 B1
(45) Date of Patent: Mar. 17, 2015

(54) SYSTEMS AND METHODS FOR ARCHIVING FILES IN DISTRIBUTED REPLICATION ENVIRONMENTS

(75) Inventors: Kishor Ghait, Maharashtra (IN); Murtaza Ghiya, Maharashtra (IN); Manoj Chaudhari, Maharashtra (IN)

(73) Assignee: Symantec Corporation, Mountain View, CA (US)

( * ) Notice: Subject to any disclaimer, the term of this patent is extended or adjusted under 35 U.S.C. 154(b) by 216 days.

(21) Appl. No.: 13/369,094

(22) Filed: Feb. 8, 2012

(51) Int. Cl.
*G06F 17/00* (2006.01)
*G06F 17/30* (2006.01)

(52) U.S. Cl.
USPC ............................. 707/604; 707/641; 715/227

(58) Field of Classification Search
CPC ............ G06F 17/3002; G06F 17/3005; G06F 17/30283; G06F 17/30067; G06F 17/30575; G01S 13/00; G06Q 10/06; G06Q 50/30
USPC .................................. 707/604, 641, 999.001
See application file for complete search history.

(56) References Cited

U.S. PATENT DOCUMENTS

| | | | | |
|---|---|---|---|---|
| 5,440,727 A * | 8/1995 | Bhide et al. | ...................... | 711/117 |
| 5,603,019 A * | 2/1997 | Kish | .............................. | 707/757 |
| 5,649,196 A * | 7/1997 | Woodhill et al. | ............. | 711/148 |
| 5,710,922 A * | 1/1998 | Alley et al. | ............................. | 1/1 |
| 5,787,262 A * | 7/1998 | Shakib et al. | .................. | 709/205 |
| 5,813,009 A * | 9/1998 | Johnson et al. | ............... | 707/695 |
| 5,873,103 A * | 2/1999 | Trede et al. | ............................. | 1/1 |
| 5,924,096 A * | 7/1999 | Draper et al. | .......................... | 1/1 |
| 6,014,669 A * | 1/2000 | Slaughter et al. | ............. | 707/610 |
| 6,202,085 B1 * | 3/2001 | Benson et al. | .................. | 709/205 |
| 6,266,785 B1 * | 7/2001 | McDowell | ...................... | 714/11 |
| 6,377,958 B1 * | 4/2002 | Orcutt | ........................... | 707/690 |
| 6,499,137 B1 * | 12/2002 | Hunt | ............................... | 717/164 |
| 6,615,223 B1 * | 9/2003 | Shih et al. | ...................... | 707/625 |
| 6,691,245 B1 * | 2/2004 | DeKoning | .................... | 714/6.31 |
| 6,826,483 B1 * | 11/2004 | Anderson et al. | ............... | 702/13 |
| 7,093,005 B2 * | 8/2006 | Patterson | ....................... | 709/220 |
| 7,231,391 B2 * | 6/2007 | Aronoff et al. | ........................ | 1/1 |
| 7,305,671 B2 * | 12/2007 | Davidov et al. | ............... | 717/172 |
| 7,606,839 B2 * | 10/2009 | Aronoff et al. | ........................ | 1/1 |
| 7,730,277 B1 * | 6/2010 | Prakash et al. | ................ | 711/170 |
| 7,769,721 B2 * | 8/2010 | Ueoka et al. | ................... | 707/679 |

(Continued)

OTHER PUBLICATIONS

Symantec; Enterprise Vault (tm) File System Archiving Support for Distributed File System (DFS); Created Jan. 12, 2006; http://www.symantec.com/docs/TECH47395.

Atanu Dey; Some of the Know Issues with DFSR; Jan. 26, 2010; http://blogs.technet.com/b/atanudey/archive/2010/01/26.

(Continued)

*Primary Examiner* — Daniel Kuddus
(74) *Attorney, Agent, or Firm* — ALG Intellectual Property, LLC

(57) ABSTRACT

A computer-implemented method for archiving files in distributed replication environments may include 1) identifying a distributed file system replication environment, the distributed file system replication environment including a plurality of computing systems configured to replicate changes made to files within each computing system in the plurality of computing system to each other computing system in the plurality of computing systems, 2) identifying a request to archive a file located on a computing system within the distributed file system replication environment, and, in response to the request 3) identifying a virtual storage layer mapped to a location of the file and 4) archiving the file by creating a placeholder file for the file in the virtual storage layer mapped to a location of the file on the computing system. Various other methods, systems, and computer-readable media are also disclosed.

20 Claims, 6 Drawing Sheets

(56) References Cited

U.S. PATENT DOCUMENTS

| | | | | |
|---|---|---|---|---|
| 8,060,476 | B1* | 11/2011 | Afonso et al. | 707/649 |
| 8,321,936 | B1* | 11/2012 | Green et al. | 726/23 |
| 8,352,444 | B1* | 1/2013 | Chang | 707/694 |
| 2003/0014442 | A1* | 1/2003 | Shiigi et al. | 707/513 |
| 2006/0059464 | A1* | 3/2006 | Jameson | 717/120 |
| 2006/0225072 | A1* | 10/2006 | Lari et al. | 717/175 |
| 2007/0162516 | A1* | 7/2007 | Thiel et al. | 707/201 |

OTHER PUBLICATIONS

Windows Server Techcenter; DFS Replicated Some Reparse Points But Not Others; Jan. 13, 2010; http://social.technet.microsoft.com/Forums/en/winserverfiles/thread.

WinServerKB; Replication of this Type of Reparse Point is not Supported by the . . . ; Jul. 26, 2006; http://www.winserverkb.com/Uwe/Forum.aspx/windows-server-dfs-frs.

* cited by examiner

SYSTEMS AND METHODS FOR ARCHIVING FILES IN DISTRIBUTED REPLICATION ENVIRONMENTS

BACKGROUND

In the digital age, organizations increasingly rely on digitally-stored data. To facilitate access to data, an organization may use distributed file system replication. Distributed file system replication systems may use a multi-master replication engine to keep data synchronized across multiple servers, thereby facilitating data sharing while potentially improving access performance.

Due to increasingly complex information technology infrastructures, traditional distributed file system replication systems may fail to interoperate well with other systems, such as archiving systems. For example, traditional archiving systems may replace local instances of files with placeholder files configured to reference a file archive. Unfortunately, these traditional archiving systems may use elements to reference archived files that are incompatible with traditional distributed file system replication systems. For example, traditional archiving systems may use reparse points to define placeholder files, and traditional distributed file system replication systems may skip the replication of reparse points in order to avoid unwanted and/or unpredictable behavior. Accordingly, the instant disclosure identifies and addresses a need for additional and improved systems and methods for archiving files in distributed replication environments.

SUMMARY

As will be described in greater detail below, the instant disclosure generally relates to systems and methods for archiving files in distributed replication environments by placing placeholder files for archived files in virtual storage layers that map to the original locations of the archived files and, in some examples, logging archiving operations and replaying replicated log files to replicate the archiving operations to other systems. In one example, a computer-implemented method for archiving files in distributed replication environments may include 1) identifying a distributed file system replication environment, the distributed file system replication environment including a plurality of computing systems configured to replicate changes made to files within each computing system in the plurality of computing system to each other computing system in the plurality of computing systems, 2) identifying a request to archive a file located on a computing system within the distributed file system replication environment, and, in response to the request 3) identifying a virtual storage layer mapped to a location of the file and 4) archiving the file by creating a placeholder file for the file in the virtual storage layer mapped to a location of the file on the computing system.

In some examples, the virtual storage layer may be mapped to the location of the file by being mapped to a directory in which the file is stored on the computing system. In some embodiments, the placeholder file may include a reparse point. In these embodiments, the distributed file system replication environment may be configured to skip replication of files including reparse points.

In one example, creating the placeholder file may include creating the placeholder file in a virtual disk file used for storing files within the virtual storage layer. In this example, the distributed file system replication environment may be configured to skip replication of the virtual disk file due to the virtual disk file being configured to store placeholder files.

In some embodiments, the computer-implemented method may also log the creation of the placeholder file in a log file on the computing system. In these embodiments, the computer-implemented method may further 1) identify a replication of the log file on an additional computing system within the plurality of computing systems and 2) replay the log file to create the placeholder file in a corresponding virtual storage layer on the additional computing system mapped to a location of the file on the additional computing system. Likewise, in some examples, the computer-implemented method may further include logging a removal of the placeholder file from the computing system and/or a change to an attribute of the placeholder file in the log file. In these examples, the computer-implemented method may also include 1) identifying a replication of the log file on an additional computing system within the plurality of computing systems and 2) replaying the log file to remove the placeholder file from the additional computing system and/or change the attribute of the placeholder file in a corresponding virtual storage layer on the additional computing system.

In one embodiment, a system for implementing the above-described method may include 1) an identification module programmed to identify a distributed file system replication environment, the distributed file system replication environment including a plurality of computing systems configured to replicate changes made to files within each computing system in the plurality of computing systems to each other computing system in the plurality of computing systems, 2) a request module programmed to identify a request to archive a file located on a computing system within the distributed file system replication environment, 3) a mapping module programmed to, in response to the request, identify a virtual storage layer mapped to a location of the file, and 4) an archival module programmed to archive the file by creating a placeholder file for the file in the virtual storage layer mapped to a location of the file on the computing system. The system may also include at least one processor configured to execute the identification module, the request module, the mapping module, and the archival module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to 1) identify a distributed file system replication environment, the distributed file system replication environment including a plurality of computing systems configured to replicate changes made to files within each computing system in the plurality of computing system to each other computing system in the plurality of computing systems, 2) identify a request to archive a file located on a computing system within the distributed file system replication environment, and, in response to the request 3) identify a virtual storage layer mapped to a location of the file and 4) archive the file by creating a placeholder file for the file in the virtual storage layer mapped to a location of the file on the computing system.

As will be explained in greater detail below, by placing placeholder files for archived files in virtual storage layers that map to the original locations of the archived files, the systems and methods described herein may properly expose the placeholder files in an expected location while storing the placeholder files in a repository (e.g., a virtual disk file) that can be replicated. Furthermore, in some examples, by logging archiving operations and replaying replicated log files to replicate the archiving operations to other systems (e.g., instead of replicating virtual disk files in which placeholder files are stored), these systems and methods may avoid incorrect resolutions to last-write-wins conflicts arising when a file is overwritten by a placeholder file during archiving. Accordingly, these systems and methods may facilitate the interoperation of distributed replication and archiving.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
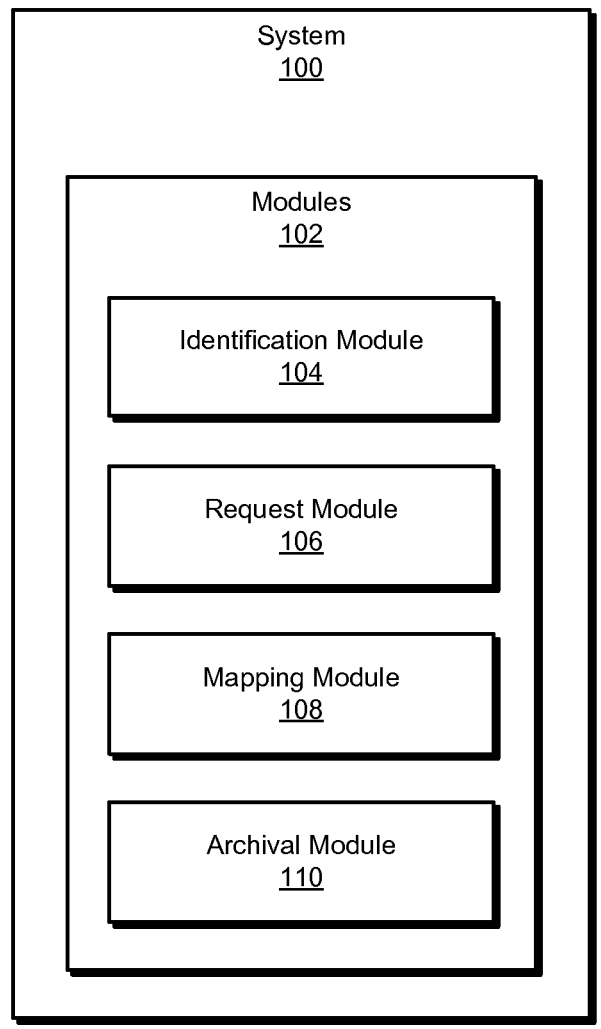
FIG. 1 is a block diagram of an exemplary system for archiving files in distributed replication environments.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Figure 2:
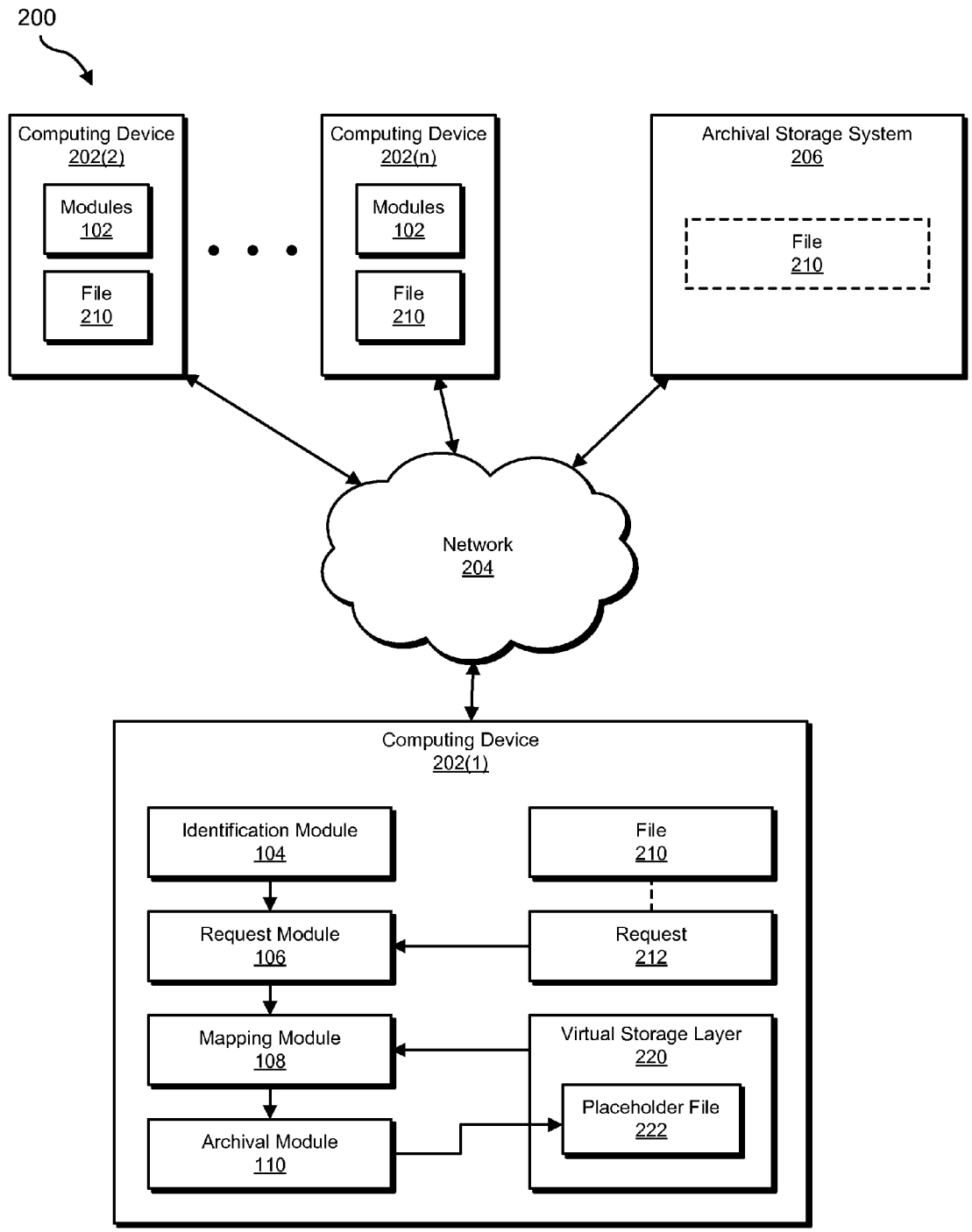
FIG. 2 is a block diagram of an exemplary system for archiving files in distributed replication environments.
Figure 3:
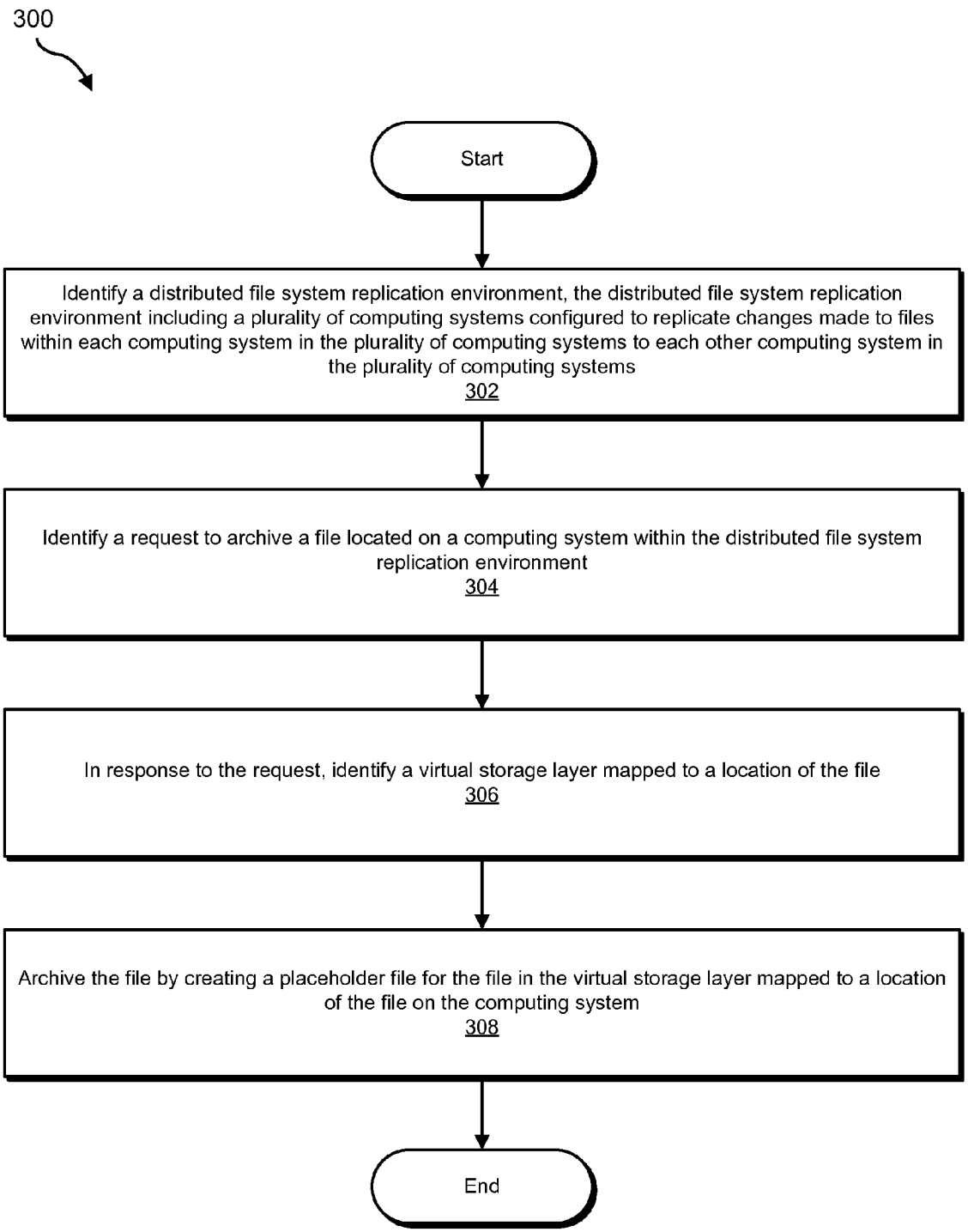
FIG. 3 is a flow diagram of an exemplary method for archiving files in distributed replication environments.
Figure 4:
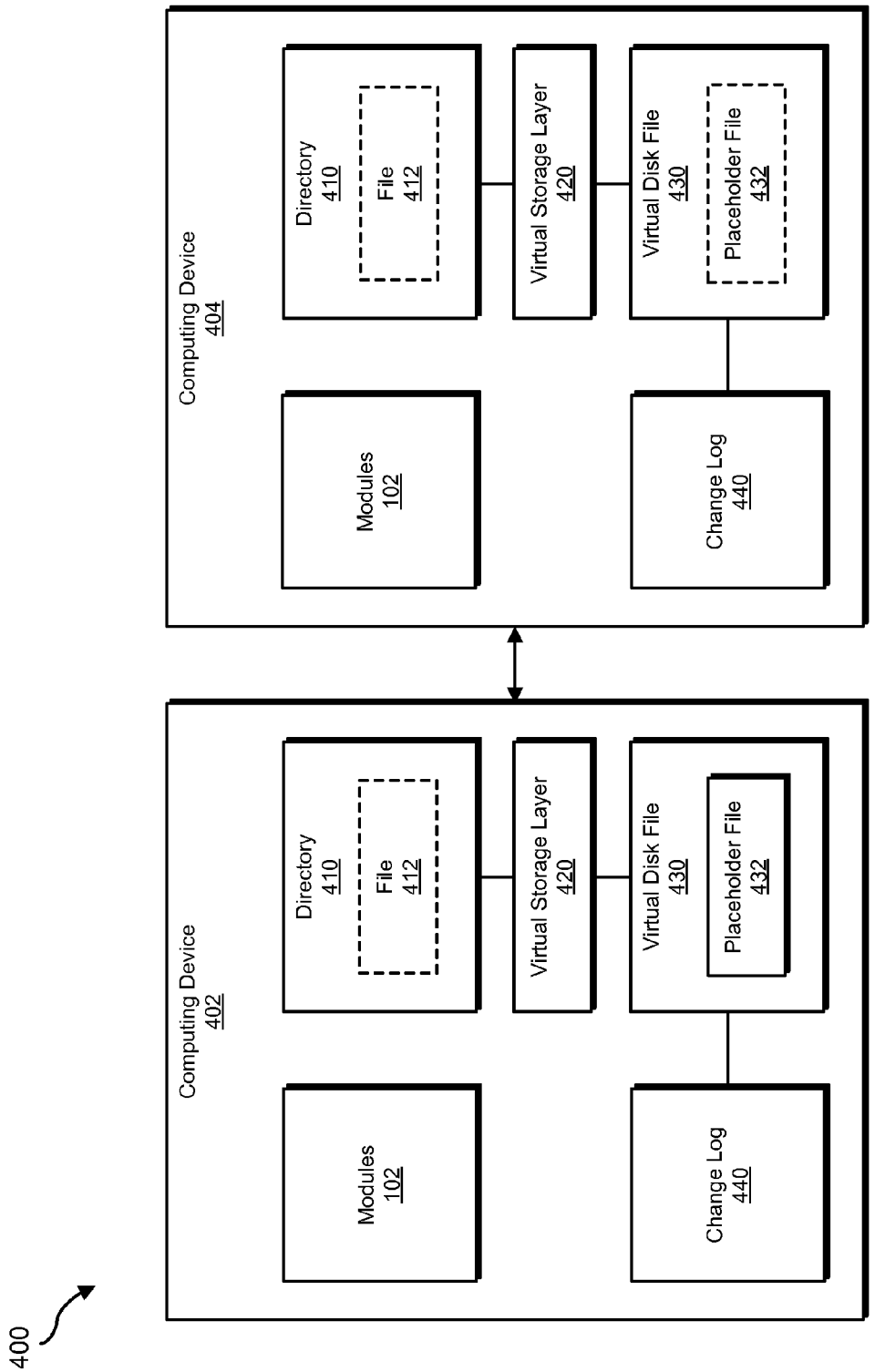
FIG. 4 is a block diagram of an exemplary system for archiving files in distributed replication environments.

The following will provide, with reference to FIGS. 1, 2, and 4, detailed descriptions of exemplary systems for archiving files in distributed replication environments. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for archiving files in distributed replication environments. As illustrated in this figure, exemplary system 100 may include one or more modules 102 for performing one or more tasks. For example, and as will be explained in greater detail below, exemplary system 100 may include an identification module 104 programmed to identify a distributed file system replication environment, the distributed file system replication environment including a plurality of computing systems configured to replicate changes made to files within each computing system in the plurality of computing systems to each other computing system in the plurality of computing systems. Exemplary system 100 may also include a request module 106 programmed to identify a request to archive a file located on a computing system within the distributed file system replication environment.

In addition, and as will be described in greater detail below, exemplary system 100 may include a mapping module 108 programmed to, in response to the request, identify a virtual storage layer mapped to a location of the file. Exemplary system 100 may also include an archival module 110 programmed to archive the file by creating a placeholder file for the file in the virtual storage layer mapped to a location of the file on the computing system. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing devices 202(1)-(n) and/or archival storage system 206), computing system 510 in FIG. 5, and/or portions of exemplary network architecture 600 in FIG. 6. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include computing devices 202(1)-(n) in communication with each other and/or an archival storage system 206 via a network 204 in order to facilitate distributed replication operations and archival operations.

In one embodiment, one or more of modules 102 from FIG. 1 may, when executed by at least one processor of computing device 202, facilitate computing device 202 in archiving files in distributed replication environments. For example, and as will be described in greater detail below, one or more of modules 102 may cause computing device 202 to 1) identify a distributed file system replication environment (e.g., system 200), system 200 including computing devices 202(1)-(n) configured to replicate changes made to files within each computing system in computing devices 202(1)-(n) to each other computing system in the plurality of computing systems, 2) identify a request 212 to archive a file 210 located on computing device 202(1) within system 200, and, in response to request 212, 3) identify a virtual storage layer 220 mapped to a location of file 210 on computing device 202(1) and 4) archive file 210 (e.g., to an archival storage system 206) by creating a placeholder file 222 for file 210 in virtual storage layer 220.

Computing device 202 generally represents any type or form of computing device capable of reading computer-executable instructions. Examples of computing device 202 include, without limitation, laptops, desktops, servers, cellular phones, personal digital assistants (PDAs), multimedia players, embedded systems, combinations of one or more of the same, exemplary computing system 510 in FIG. 5, or any other suitable computing device.

Archival storage system 206 generally represents any type or form of computing device that is capable of receiving, storing, processing, archiving, retrieving, and/or restoring files for archival. Examples of archival storage system 206 include, without limitation, application servers and database servers configured to provide various database services and/or run certain software applications. Archival storage system 206 may represent portions of a single database or computing device or a plurality of databases or computing devices. For example, archival storage system 206 may represent a portion of computing system 510 in FIG. 5 and/or portions of exemplary network architecture 600 in FIG. 6. Alternatively, archival storage system 206 in FIG. 2 may represent one or more physically separate devices capable of being accessed by a computing device, such as computing system 510 in FIG. 5 and/or portions of exemplary network architecture 600 in FIG. 6.

Network 204 generally represents any medium or architecture capable of facilitating communication or data transfer. Examples of network 204 include, without limitation, an intranet, a wide area network (WAN), a local area network (LAN), a storage area network (SAN), a personal area network (PAN), the Internet, power line communications (PLC), a cellular network (e.g., a GSM Network), exemplary network architecture 600 in FIG. 6, or the like. Network 204 may facilitate communication or data transfer using wireless or wired connections. In one embodiment, network 204 may facilitate communication between computing devices 202(1)-(n) and archival storage system 206.

FIG. 3 is a flow diagram of an exemplary computer-implemented method 300 for archiving files in distributed replication environments. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

As illustrated in FIG. 3, at step 302 one or more of the systems described herein may identify a distributed file system replication environment, the distributed file system replication environment including a plurality of computing systems configured to replicate changes made to files within each computing system in the plurality of computing system to each other computing system in the plurality of computing systems. For example, at step 302 identification module 104 may, as part of computing device 202 in FIG. 2, identify a distributed file system replication environment (e.g., system 200), system 200 including computing devices 202(1)-(n) configured to replicate changes made to files within each computing system in computing devices 202(1)-(n) to each other computing system in the plurality of computing systems.

As used herein, the phrase "distributed file system replication environment" may refer to any computing environment in which data is synchronized across multiple servers through multi-master replication. For example, a distributed file system replication environment may store data with multiple systems and allow each system to perform updates to the data. In some examples, distributed file system replication environments may improve endpoint access performance and/or eliminate single points of failure. The distributed file system replication environment may employ any of a variety of topologies. For example, the distributed file system replication environment may employ a fully connected mesh, a partially connected mesh, a hub-and-spoke topology, and/or any other suitable configuration.

Identification module 104 may identify the distributed file system replication environment in any of a variety of ways. For example, identification module 104 may identify the distributed file system replication environment by executing on one or more computing systems within the plurality of computing systems in the distributed file system replication environment. Additionally or alternatively, identification module 104 may identify the distributed file system replication environment by reading a configuration store that identifies the distributed file system replication environment.

FIG. 4 illustrates an exemplary system 400 for archiving files in distributed replication environments. As shown in FIG. 4, exemplary system 400 may include a computing device 402 and a computing device 404. Using FIG. 4 as an example, at step 302 identification module 104 may, as a part of modules 102 on computing device 402, identify system 400 as the distributed file system replication environment (e.g., by executing on computing device 402 within system 400).

Returning to FIG. 3, at step 304 one or more of the systems described herein may identify a request to archive a file located on a computing system within the distributed file system replication environment. For example, at step 304 request module 106 may, as part of computing device 202 in FIG. 2, identify request 212 to archive file 210 located on computing device 202(1) within system 200.

As used herein, the term "archive" may refer to any process and/or system for migrating data from a primary storage system to a secondary storage system, e.g., in order to save high-value storage space on the primary storage system by storing the data on low-value storage space on the secondary storage system. For example, as used herein the term "archiving" may file migration performed for hierarchical storage management. As will be explained in greater detail below, in some examples archiving may include creating a placeholder file to stand in for an archived file.

Request module 106 may identify the request in any suitable context. For example, request module 106 may identify the request as a part of an archiving system. Additionally or alternatively, request module 106 may identify the request by intercepting the request when submitted to the archiving system and/or intercepting an operation performed by the archiving system.

Using FIG. 4 as an example, at step 304 request module 106 may, as a part of modules 102 on computing device 402, identify a request to archive a file 412 in a directory 410.

Returning to FIG. 3, at step 306 one or more of the systems described herein may, in response to the request, identify a virtual storage layer mapped to a location of the file. For example, at step 306 mapping module 108 may, as part of computing device 202 in FIG. 2, in response to request 212, identify virtual storage layer 220 mapped to a location of file 210 on computing device 202(1).

As used herein, the phrase "virtual storage layer" may refer to any virtualization and/or abstraction used for adding one or more data objects to a storage view of a storage location. The virtual storage layer may be implemented in any suitable manner. For example, the virtual storage layer may be implemented within a filter driver (e.g., a minifilter driver). In this example, an application may attempt to access a view of a storage location, and the filter driver may intercept the attempt, retrieve the view of the storage location, and augment the view of the storage location with one or more data objects in virtual storage associated with the storage location.

Mapping module 108 may identify the virtual storage layer in any suitable manner. In some examples, the virtual storage layer may be mapped to the location of the file by being mapped to a directory in which the file is stored on the computing system. For example, the virtual storage layer may add one or more files to a view of the directory that is exposed to one or more applications that attempt to access the directory and/or contents of the directory via a file system. Accordingly, mapping module 108 may identify the virtual storage layer mapped to the directory of the file.

Using FIG. 4 as an example, computing device 402 may include a virtual storage layer 420 mapped to directory 410. Accordingly, files within virtual storage layer 420 (e.g., within a virtual disk file 430) may appear to be stored within directory 410.

Returning to FIG. 3, at step 308 one or more of the systems described herein may archive the file by creating a placeholder file for the file in the virtual storage layer mapped to a location of the file on the computing system. For example, at step 308 archival module 110 may, as part of computing device 202 in FIG. 2, in response to request 212, archive file 210 (e.g., to an archival storage system 206) by creating placeholder file 222 for file 210 in virtual storage layer 220.

As used herein, the phrase "placeholder file" may refer to any placeholder, reference, and/or stub left in place of migrated data in archiving operations. For example, a placeholder file may include a small file with the same file path and/or name as an archived file but which references the archived file instead of storing the full contents of the archived file. In some examples, the placeholder file may include a reparse point. As used herein, the phrase "reparse point" may refer to any metadata and/or instructions associated with a file system location to extend the functionality of a file system at the file system location. For example, the placeholder file may include the reparse point in order to associate the placeholder file with the archived file (e.g., to automatically retrieve the archived file when the placeholder file is accessed). In some examples, the distributed file system replication environment may be configured to skip replication of files including reparse points. Accordingly, the distributed file system replication environment may be configured to skip replication of placeholder files.

Archival module 110 may create the placeholder file in the virtual storage layer in any suitable manner. For example, archival module 110 may create the placeholder file in a virtual disk file used for storing files within the virtual storage layer. In this example, the virtual storage layer may be configured to identify files stored within the virtual disk file and present the files within the virtual disk file as present within the location indicated by the virtual storage layer. In some examples, the distributed file system replication environment may be configured to skip replication of the virtual disk file due to the virtual disk file being configured to store placeholder files. In this manner, archival module 110 may avoid incorrect resolutions to last-write-wins conflicts arising when the file is overwritten by the placeholder file during archiving. As will be discussed in greater detail below, archival module 110 may propagate archiving-base changes with alternative methods.

In some examples, archival module 110 may also log the creation of the placeholder file in a log file on the computing system. For example, archival module 110 may use a change journal (e.g., an Update Sequence Number Journal) to identify changes made to a virtual disk file associated with the virtual storage layer. Archival module 110 may then use a Common Log File System to create a log of the changes. Archival module 110 may store the log in any appropriate location such that a replication engine of the distributed file system replication environment may replicate the log. Additionally or alternatively, archival module 110 may transmit the log to other computing systems within the distributed file system replication environment in any other suitable manner.

Once the log is replicated within the distributed file system replication environment, archival module 110 and/or one or more other systems described herein may identify a replication of the log file on an additional computing system within the plurality of computing systems. For example, archival module 110 may, on each computing system, be configured to identify an incoming replicated log from every other computing system within the distributed file system replication environment. Archival module 110 may then replay the log file to create the placeholder file in a corresponding virtual storage layer on the additional computing system mapped to a location of the file on the additional computing system. In this manner, the corresponding virtual storage layer on the additional computing system may be synchronized with the virtual storage layer on the computing system with respect to the placeholder file.

In addition to logging the creation of the placeholder file, in some examples archival module 110 may also log a removal of the placeholder file from the computing system and/or a change to an attribute of the placeholder file in the log file. In these examples, once the log file is replicated, archival module 110 and/or one or more other systems within the plurality of computing systems may identify a replication of the log file on an additional computing system within the plurality of computing systems. Archival module 110 may then replay the log file to remove the placeholder file from the additional computing system (if so indicated by the log file) or change the attribute of the placeholder file (if so indicated by the log file) in a corresponding virtual storage layer on the additional computing system. In this manner, all changes to placeholder files may be replicated via replaying replicated logs.

Using FIG. 4 as an example, archival module 110 may, as a part of computing device 402, archive file 412 by migrating file 412 to an archive storage system, removing file 412 from directory 410 on computing device 402, and creating a placeholder file 432 within virtual disk file 430. Placeholder file 432 may therefore appear within directory 410 via virtual storage layer 420. Archival module 110 may also capture and store the addition of placeholder file 432 to virtual disk file 430 in a change log 440. Once change log 440 is replicated to computing device 404 (and, e.g., the removal of file 412 from directory 410 is replicated to computing device 404), archival module 110 may, as a part of computing device 404, replay change log 440, thereby creating placeholder file 432 within virtual disk file 430 on computing device 404.

As explained above, by placing placeholder files for archived files in virtual storage layers that map to the original locations of the archived files, the systems and methods described herein may properly expose the placeholder files in an expected location while storing the placeholder files in a repository (e.g., a virtual disk file) that can be replicated. Furthermore, in some examples, by logging archiving operations and replaying replicated log files to replicate the archiving operations to other systems (e.g., instead of replicating virtual disk files in which placeholder files are stored), these systems and methods may avoid incorrect resolutions to last-write-wins conflicts arising when a file is overwritten by a placeholder file during archiving. Accordingly, these systems and methods may facilitate the interoperation of distributed replication and archiving.

Figure 5:
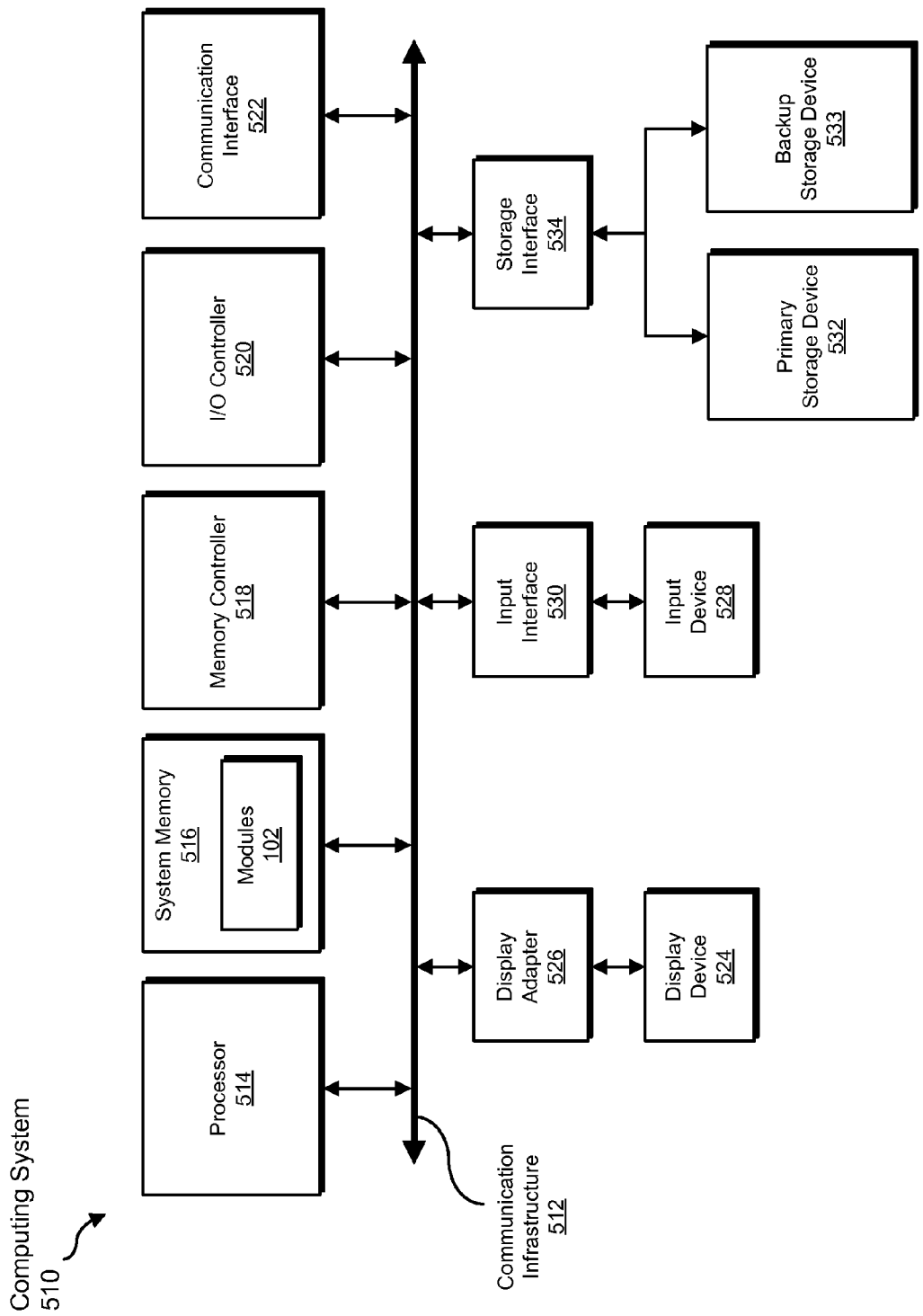
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the identifying, archiving, creating, logging, and replaying steps described herein. All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, random access memory (RAM), read only memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an ISA, PCI, PCIe, or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable-storage medium containing the computer program may be loaded into computing system 510. All or a portion of the computer program stored on the computer-readable-storage medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an application specific integrated circuit (ASIC) adapted to implement one or more of the exemplary embodiments disclosed herein.

Figure 6:
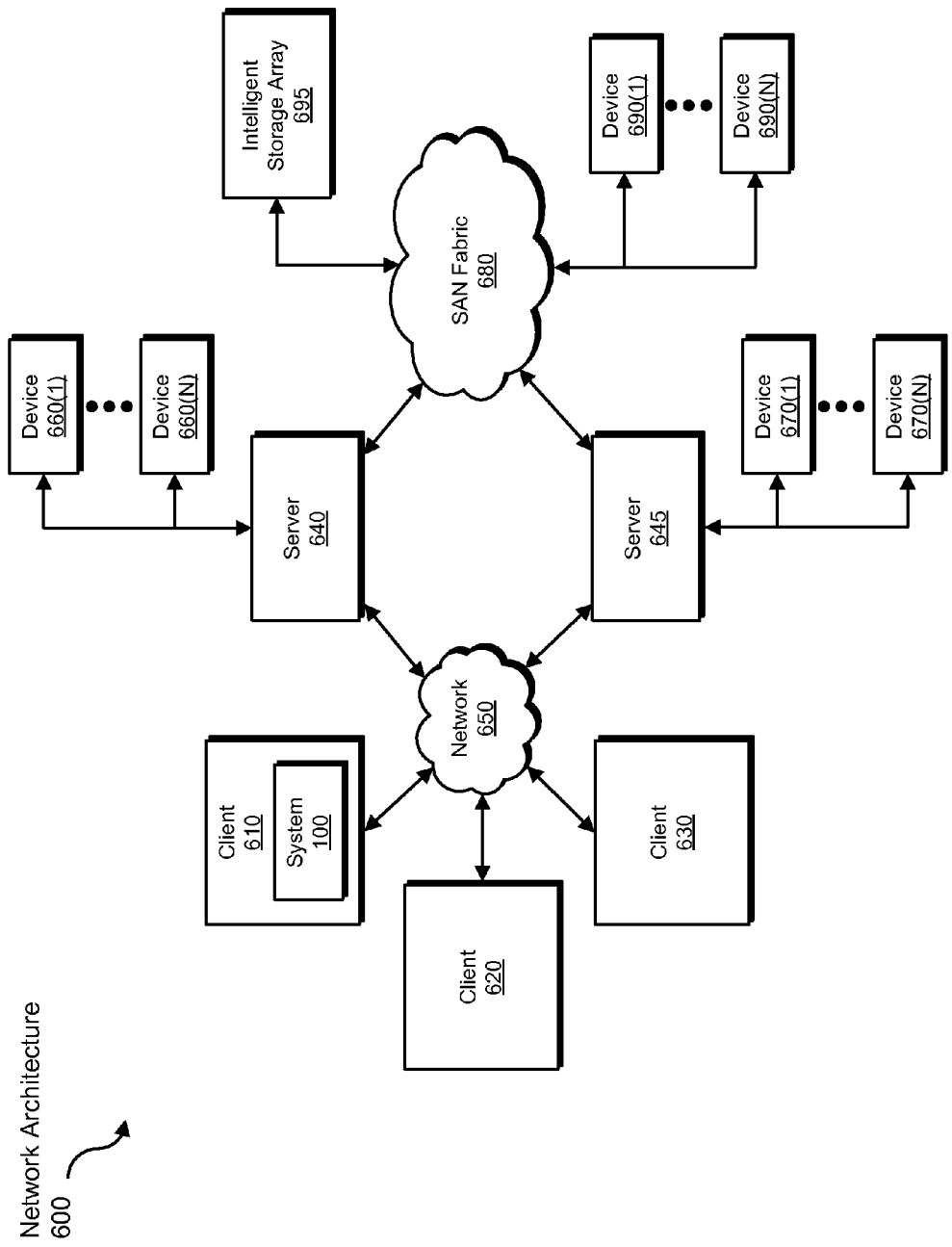
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the identifying, archiving, creating, logging, and replaying steps disclosed herein. All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a wide area network (WAN), a local area network (LAN), a personal area network (PAN), or the Internet. In one example, client systems 610, 620, and/or 630 and/or servers 640 and/or 645 may include all or a portion of system 100 from FIG. 1.

As illustrated in FIG. 6, one or more storage devices 660 (1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as NFS, SMB, or CIFS.

Servers 640 and 645 may also be connected to a storage area network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690 (1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for archiving files in distributed replication environments.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may transform a computing system into a system for archiving files in distributed replication environments.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for archiving files in distributed replication environments, at least a portion of the method being performed by a computing device comprising at least one processor, the method comprising:
   identifying a distributed file system replication environment that synchronizes data across computing systems using multi-master replication, wherein:
      the distributed file system replication environment comprises a plurality of computing systems configured to replicate changes made to files within each computing system in the plurality of computing systems to each other computing system in the plurality of computing systems;
      the distributed file system replication environment is configured to skip replication of files comprising reparse points;
   identifying a request to archive a file located on a computing system within the distributed file system replication environment;
   in response to the request:
      identifying a virtual storage layer mapped to a location of the file;
      archiving the file by creating a placeholder file comprising a reparse point for the file in the virtual storage layer mapped to the location of the file on the computing system;
      logging the creation of the placeholder file in a log file on the computing system;
   avoiding incorrect resolutions to last-write-wins conflicts arising when a file is overwritten by a placeholder file during archiving by:
      identifying a replication of the log file on an additional computing system within the plurality of computing systems;
      replaying the log file to create the placeholder file in a corresponding virtual storage layer on the additional computing system mapped to a location of the file on the additional computing system.

2. The computer-implemented method of claim 1, wherein creating the placeholder file in the virtual storage layer comprises creating the placeholder file in a virtual disk file used for storing files within the virtual storage layer.

3. The computer-implemented method of claim 2, wherein the distributed file system replication environment is configured to skip replication of the virtual disk file due to the virtual disk file being configured to store placeholder files.

4. The computer-implemented method of claim 1, wherein replaying the log file to create the placeholder file in the corresponding virtual storage layer on the additional computing system comprises replaying the log file such that the corresponding virtual layer on the additional computing system is synchronized with the virtual storage layer on the computing system with respect to the placeholder file.

5. The computer-implemented method of claim 1, wherein:
   the virtual storage layer is implemented within a filter driver;
   the filter driver intercepts attempts to access a view of the location of the file on the computing system, retrieves the view of the location of the file, and augments the view of the location of the file with one or more data objects in the virtual storage layer.

6. The computer-implemented method of claim 1, further comprising logging at least one of a removal of the placeholder file from the computing system and a change to an attribute of the placeholder file in the log file.

7. The computer-implemented method of claim 6, further comprising replaying the log file to at least one of remove the placeholder file from the additional computing system and change the attribute of the placeholder file in the corresponding virtual storage layer on the additional computing system.

8. The computer-implemented method of claim 1, wherein the virtual storage layer is mapped to the location of the file by being mapped to a directory in which the file is stored on the computing system.

9. The computer-implemented method of claim 1, wherein identifying the request to archive the file comprises at least one of:
   identifying the request as part of an archiving system;
   identifying the request by intercepting the request when the request is submitted to the archiving system;
   identifying the request by intercepting an operation performed by the archiving system.

10. A system for archiving files in distributed replication environments, the system comprising:
   an identification module programmed to identify a distributed file system replication environment that synchronizes data across computing systems using multi-master replication, wherein:
      the distributed file system replication environment comprises a plurality of computing systems configured to replicate changes made to files within each computing system in the plurality of computing systems to each other computing system in the plurality of computing systems;
      the distributed file system replication environment is configured to skip replication of files comprising reparse points;
   a request module programmed to identify a request to archive a file located on a computing system within the distributed file system replication environment;
   a mapping module programmed to, in response to the request, identify a virtual storage layer mapped to a location of the file;
   an archival module programmed to:
      archive the file by creating a placeholder file comprising a reparse point for the file in the virtual storage layer mapped to the location of the file on the computing system;
      log the creation of the placeholder file in a log file on the computing system;
      avoid incorrect resolutions to last-write-wins conflicts arising when a file is overwritten by a placeholder file during archiving by:
         identifying a replication of the log file on an additional computing system within the plurality of computing systems;
         replaying the log file to create the placeholder file in a corresponding virtual storage layer on the additional computing system mapped to a location of the file on the additional computing system;
   at least one hardware processor configured to execute the identification module, the request module, the mapping module, and the archival module.

11. The system of claim 10, wherein the archival module is programmed to create the placeholder file in the virtual storage layer by creating the placeholder file in a virtual disk file used for storing files within the virtual storage layer.

12. The system of claim 11, wherein the distributed file system replication environment is configured to skip replication of the virtual disk file due to the virtual disk file being configured to store placeholder files.

13. The system of claim 10, wherein the archival module is further programmed to replay the log file to create the placeholder file in the corresponding virtual storage layer on the additional computing system by replaying the log file such that the corresponding virtual layer on the additional computing system is synchronized with the virtual storage layer on the computing system with respect to the placeholder file.

14. The system of claim 10, wherein:
   the virtual storage layer is implemented within a filter driver;
   the filter driver is configured to:
      intercept attempts to access a view of the location of the file on the computing system;
      retrieve the view of the location of the file;
      augment the view of the location of the file with one or more data objects in the virtual storage layer.

15. The system of claim 10, wherein the archival module is further programmed to log at least one of a removal of the placeholder file from the computing system and a change to an attribute of the placeholder file in the log file.

16. The system of claim 15, wherein the archival module is further programmed to replay the log file to at least one of remove the placeholder file from the additional computing system and change the attribute of the placeholder file in a corresponding virtual storage layer on the additional computing system.

17. The system of claim 10, wherein the virtual storage layer is mapped to the location of the file by being mapped to a directory in which the file is stored on the computing system.

18. The system of claim 10, wherein the request module is programmed to identify the request to archive the file by at least one of:
   identifying the request as part of an archiving system;
   identifying the request by intercepting the request when the request is submitted to the archiving system;
   identifying the request by intercepting an operation performed by the archiving system.

19. A non-transitory computer-readable-storage medium comprising one or more computer-executable instructions that, when executed by at least one processor of a computing device, cause the computing device to:
   identify a distributed file system replication environment that synchronizes data across computing systems using multi-master replication, wherein:
      the distributed file system replication environment comprises a plurality of computing systems configured to replicate changes made to files within each computing system in the plurality of computing systems to each other computing system in the plurality of computing systems;
      the distributed file system replication environment is configured to skip replication of files comprising reparse points;
   identify a request to archive a file located on a computing system within the distributed file system replication environment;
   in response to the request:
      identify a virtual storage layer mapped to a location of the file;
      archive the file by creating a placeholder file comprising a reparse point for the file in the virtual storage layer mapped to the location of the file on the computing system;
      log the creation of the placeholder file in a log file on the computing system;

avoid incorrect resolutions to last-write-wins conflicts arising when a file is overwritten by a placeholder file during archiving by:
  identifying a replication of the log file on an additional computing system within the plurality of computing systems;
  replaying the log file to create the placeholder file in a corresponding virtual storage layer on the additional computing system mapped to a location of the file on the additional computing system.

20. The non-transitory computer-readable-storage medium of claim 19, wherein the one or more computer-executable instructions cause the computing device to create the placeholder file in the virtual storage layer by causing the computing device to create the placeholder file in a virtual disk file used for storing files within the virtual storage layer.

* * * * *